(12) United States Patent
Hiratsuka

(10) Patent No.: US 7,935,878 B2
(45) Date of Patent: *May 3, 2011

(54) SYSTEM, METHOD AND COMPUTER PROGRAM FOR ENSURING SECURE USE OF MUSIC PLAYING DATA FILES

(75) Inventor: Satoshi Hiratsuka, Hamamatsu (JP)

(73) Assignee: Yamaha Corporation (JP)

(*) Notice: Subject to any disclaimer, the term of this patent is extended or adjusted under 35 U.S.C. 154(b) by 787 days.
This patent is subject to a terminal disclaimer.

(21) Appl. No.: 11/935,981

(22) Filed: Nov. 6, 2007

(65) Prior Publication Data
US 2010/0024629 A1 Feb. 4, 2010

Related U.S. Application Data

(63) Continuation of application No. 10/670,157, filed on Sep. 24, 2003, now Pat. No. 7,371,959.

(30) Foreign Application Priority Data

Sep. 24, 2002 (JP) .................... 2002-277035

(51) Int. Cl.
*G10H 1/00* (2006.01)

(52) U.S. Cl. .......... 84/600; 84/601; 705/51; 713/194; 382/100

(58) Field of Classification Search ........... 84/600–603, 84/616, 645, 654; 705/51; 713/194; 382/100
See application file for complete search history.

(56) References Cited

U.S. PATENT DOCUMENTS

| 5,119,711 A | 6/1992 | Bell et al. |
| 5,147,970 A | 9/1992 | Obata |
| 5,805,545 A | 9/1998 | Nakamaru et al. |
| 5,889,860 A | 3/1999 | Eller et al. |
| 6,346,667 B2 | 2/2002 | Ishii |
| 6,552,254 B2 | 4/2003 | Hasegawa et al. |
| 6,570,080 B1 | 5/2003 | Hasegawa et al. |

(Continued)

FOREIGN PATENT DOCUMENTS

CN 1263305 A 8/2000

(Continued)

OTHER PUBLICATIONS

Relevant portion of European Search Report dated Dec. 18, 2006 for corresponding European Application No. 03103512.1-2218.

*Primary Examiner* — David S. Warren

(74) *Attorney, Agent, or Firm* — Rossi, Kimms & McDowell LLP

(57) ABSTRACT

A system, apparatus, or method extracts a music playing data file from a given musical work resource such as an electronic music score data file, a printed sheet of music and an audio signals of a musical performance, to be utilized for playing music automatically by means of a tone generator device. The extracted music playing data file is encrypted using an encryption key to be stored in a storage device or to be transmitted to an automatic music playing apparatus. The stored or the transmitted music playing data file is decrypted beforehand to be used for automatic music playing. After the decrypted music playing data file has been utilized, the decrypted music playing data file is deleted from the system so that no unencrypted data file remains in the system.

8 Claims, 13 Drawing Sheets

System Configration

U.S. PATENT DOCUMENTS

| | | |
|---|---|---|
| 6,792,539 B1 | 9/2004 | Oishi et al. |
| 6,798,885 B1 | 9/2004 | Malcolm |
| 7,254,838 B2 * | 8/2007 | Kim et al. .................. 726/29 |
| 7,509,682 B2 * | 3/2009 | Belenko et al. ............ 726/26 |
| 7,567,487 B2 * | 7/2009 | Ito et al. ................. 369/47.12 |
| 7,760,988 B2 * | 7/2010 | Yamamoto et al. ......... 386/94 |
| 2002/0103759 A1 | 8/2002 | Matsumoto et al. |
| 2002/0107803 A1 | 8/2002 | Lisanke et al. |
| 2002/0118838 A1 * | 8/2002 | Belenko et al. ............ 380/277 |
| 2002/0126874 A1 | 9/2002 | Haruki |
| 2002/0169973 A1 * | 11/2002 | Kim et al. ................. 713/193 |
| 2004/0136698 A1 * | 7/2004 | Mock ........................ 386/123 |
| 2005/0008812 A1 * | 1/2005 | Jackson et al. ........... 428/64.4 |
| 2005/0114295 A1 * | 5/2005 | Takashima ................... 707/1 |
| 2007/0122111 A1 * | 5/2007 | Yamamoto et al. ......... 386/95 |
| 2007/0271469 A1 * | 11/2007 | Kim et al. ................. 713/189 |
| 2007/0274179 A1 * | 11/2007 | Ito et al. ................. 369/47.12 |
| 2008/0247542 A1 * | 10/2008 | Aylward et al. ............ 380/201 |
| 2009/0297128 A1 * | 12/2009 | Nagasaka et al. ........... 386/95 |
| 2009/0299823 A1 * | 12/2009 | Nagasaka et al. ........... 705/10 |
| 2009/0300036 A1 * | 12/2009 | Nagasaki ................... 707/100 |
| 2010/0024044 A1 * | 1/2010 | Ganesan ..................... 726/27 |
| 2010/0024629 A1 * | 2/2010 | Hiratsuka ................... 84/645 |

FOREIGN PATENT DOCUMENTS

| | | |
|---|---|---|
| JP | 2000-236325 A | 8/2000 |
| JP | 2001-042861 A | 2/2001 |
| JP | 2001-042866 A | 2/2001 |
| JP | 2002-108747 A | 4/2002 |
| WO | 98/12876 A1 | 3/1998 |

* cited by examiner

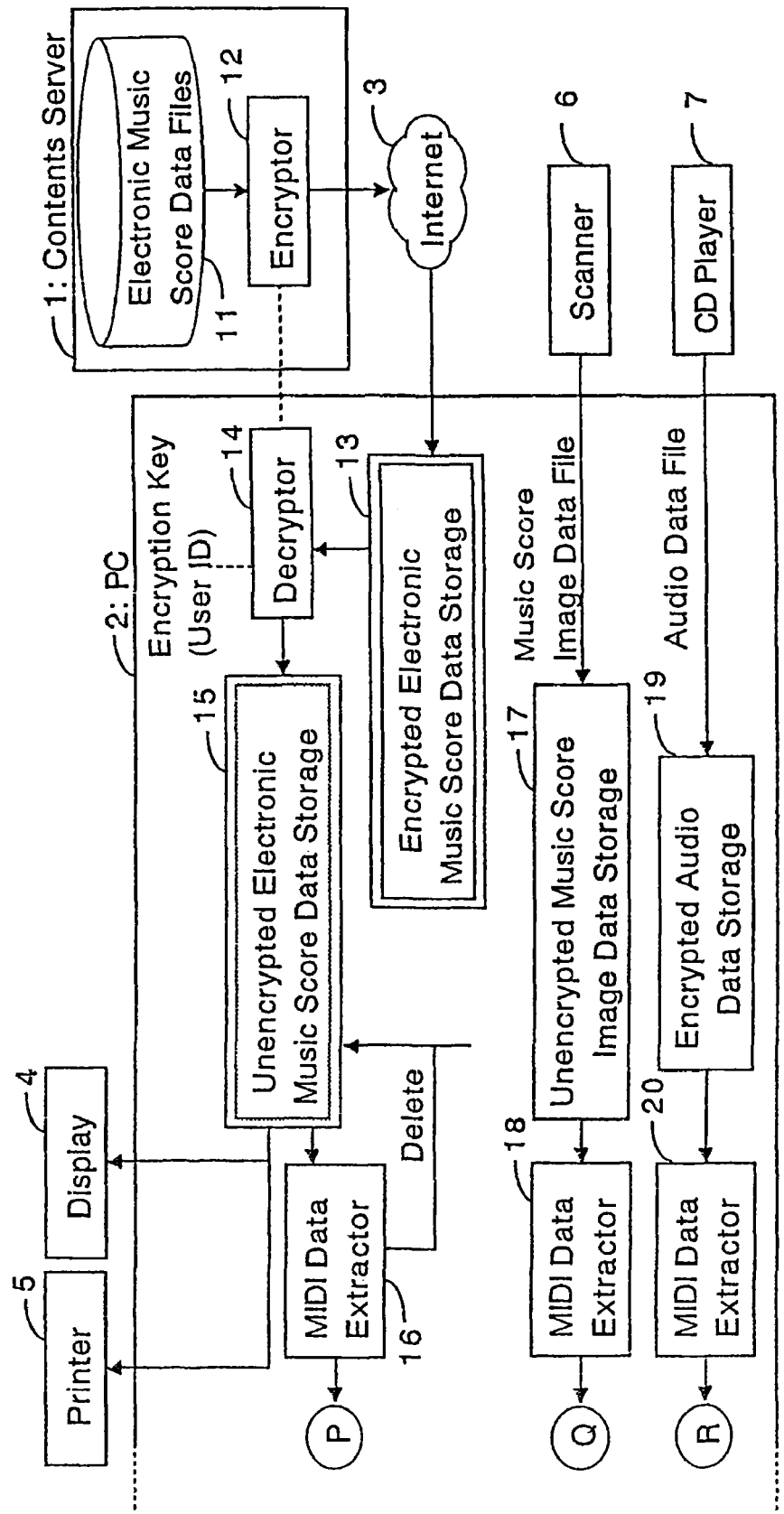
Fig. 1a System Configuration (Part 1)

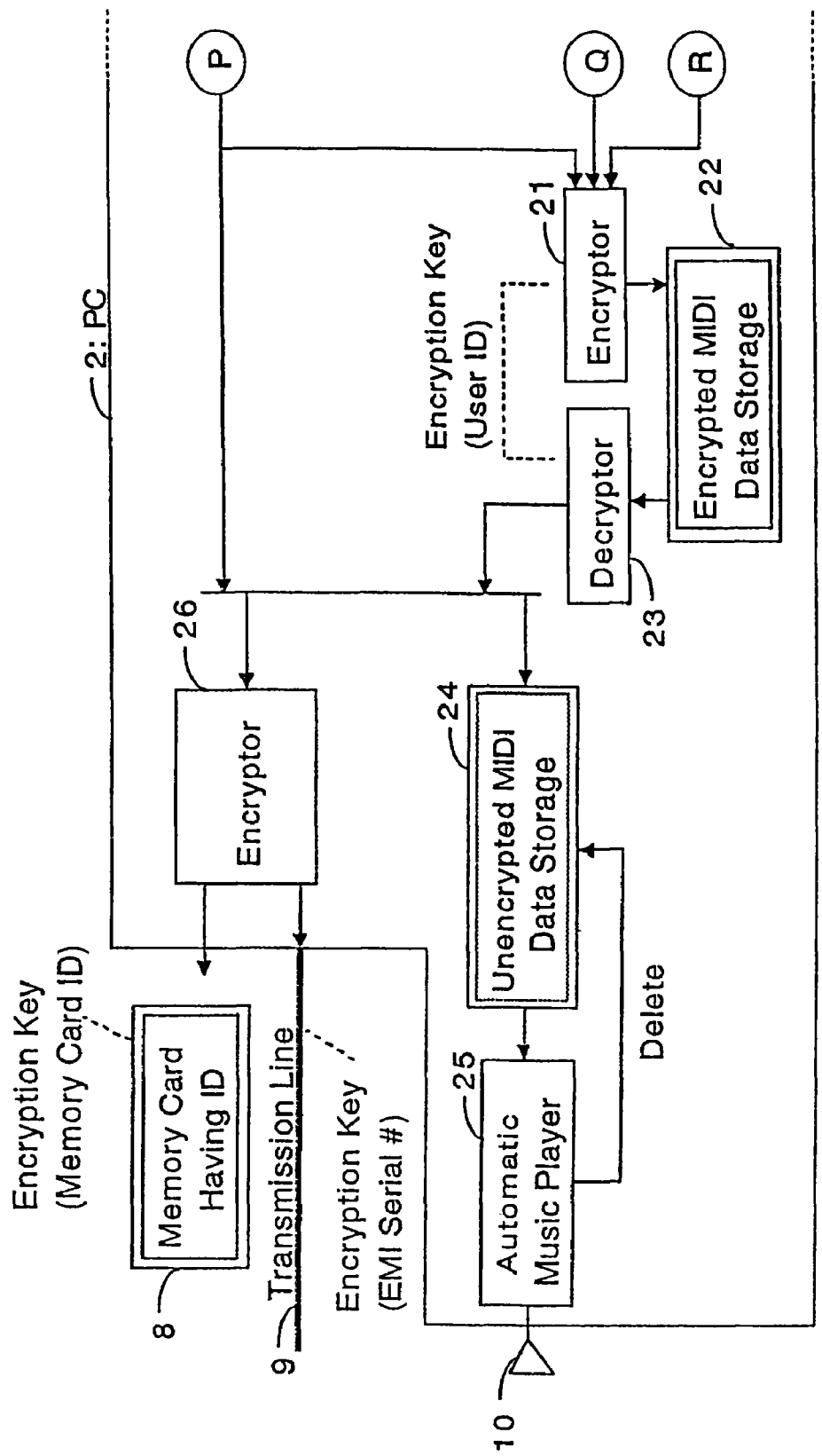
Fig. 1b System Configuration (Part 2)

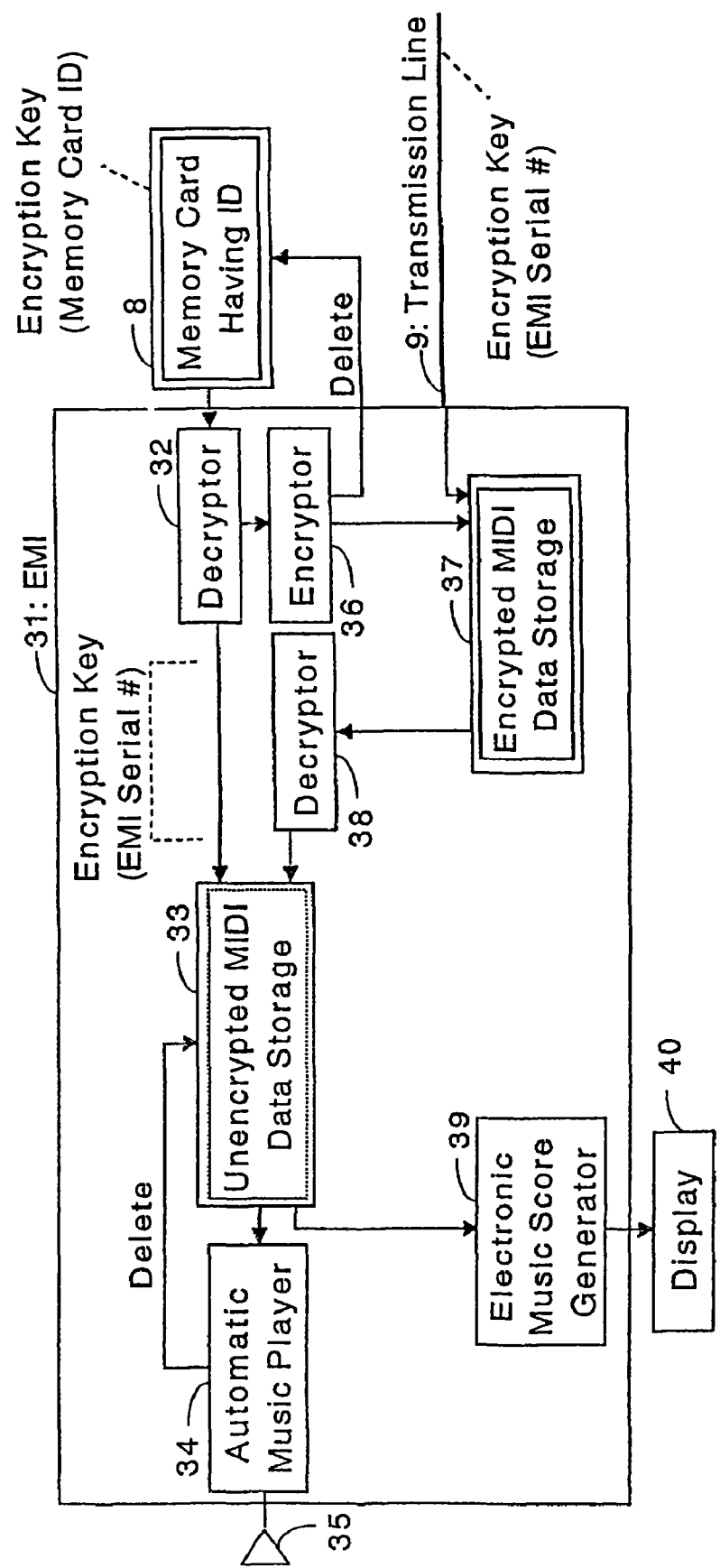
Fig. 2  System Configuration

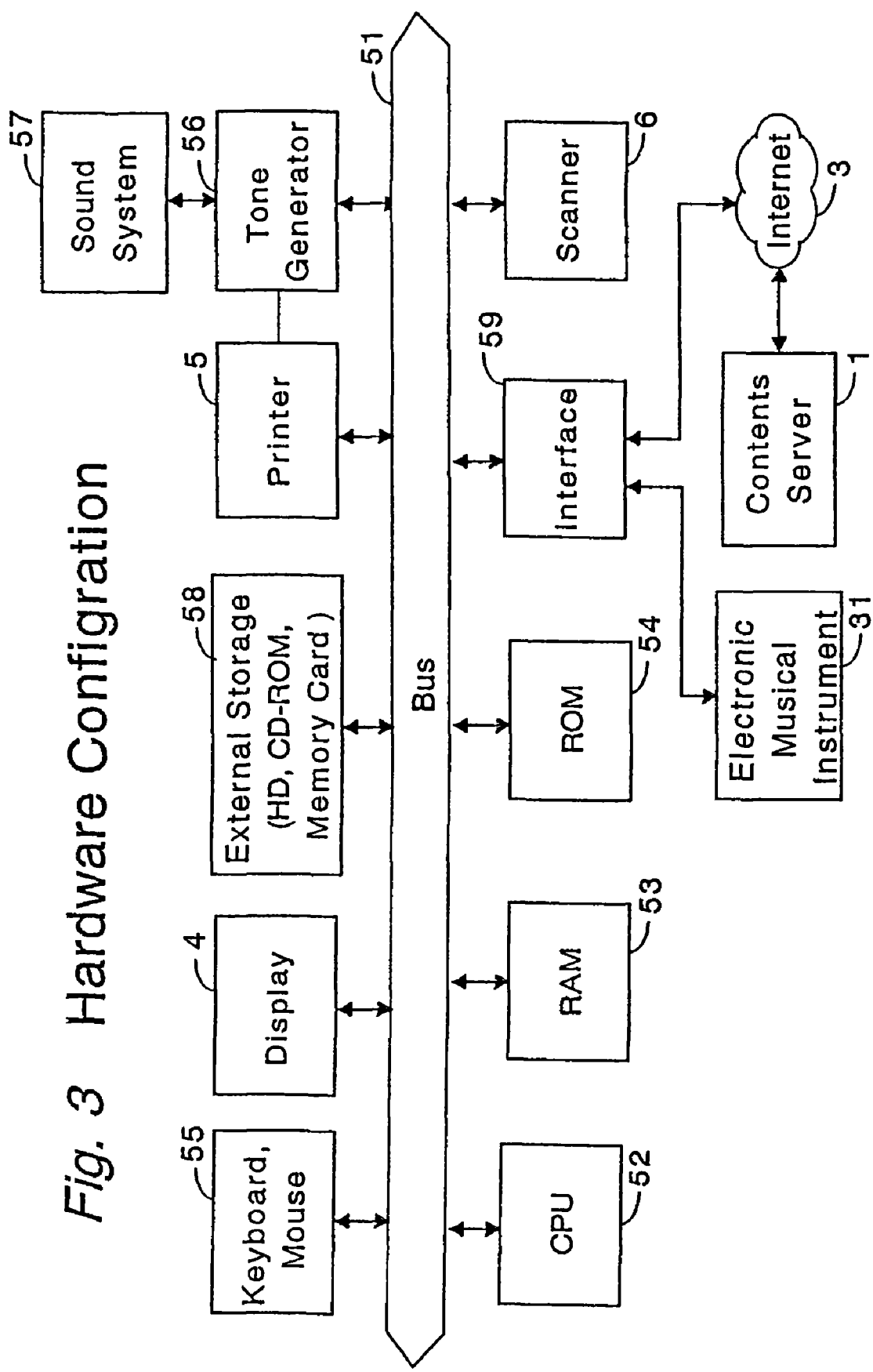
Fig. 3 Hardware Configuration

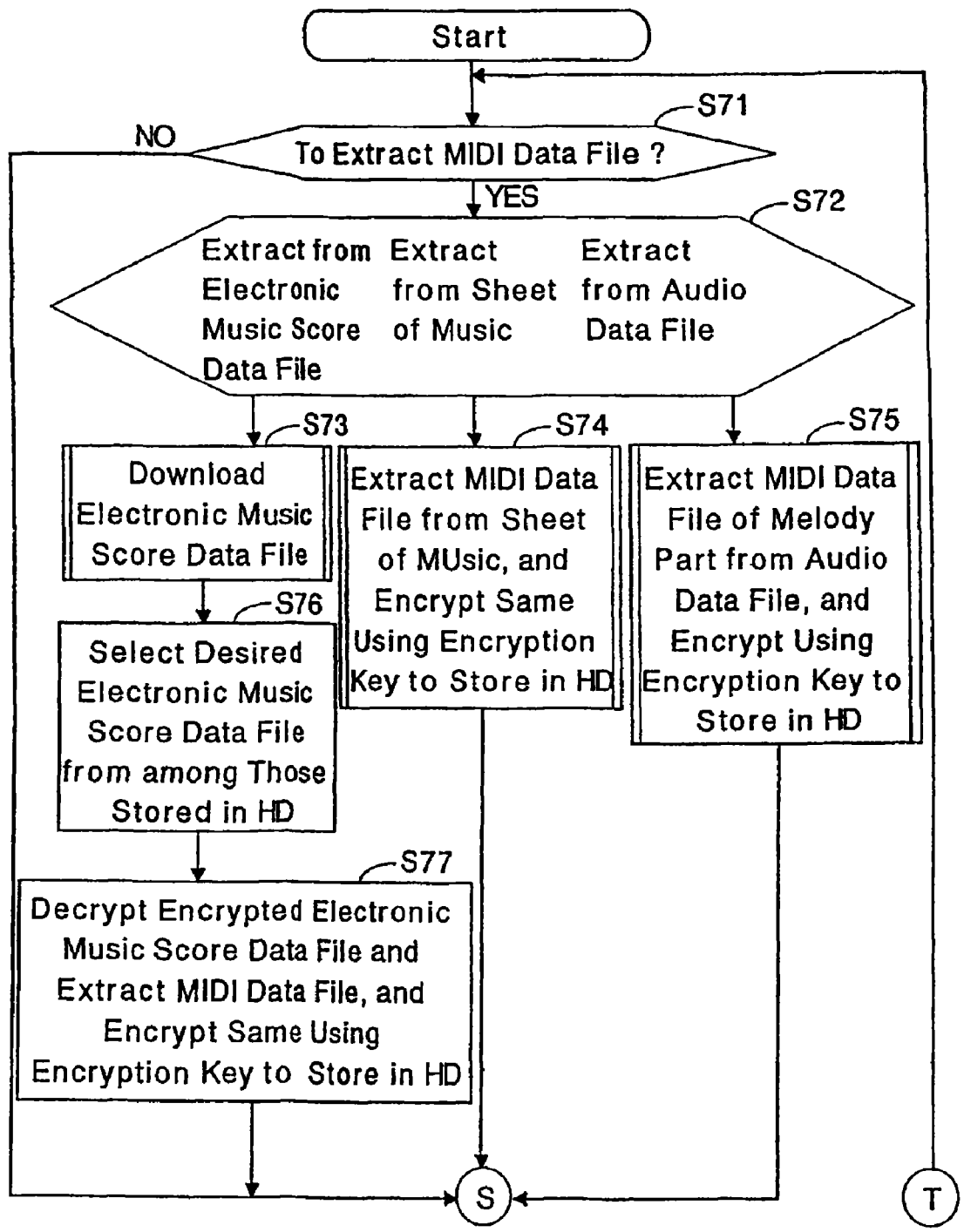
*Fig. 4a* PC Application Program (Part 1)

*Fig. 4b* PC Application Program (Part 2)
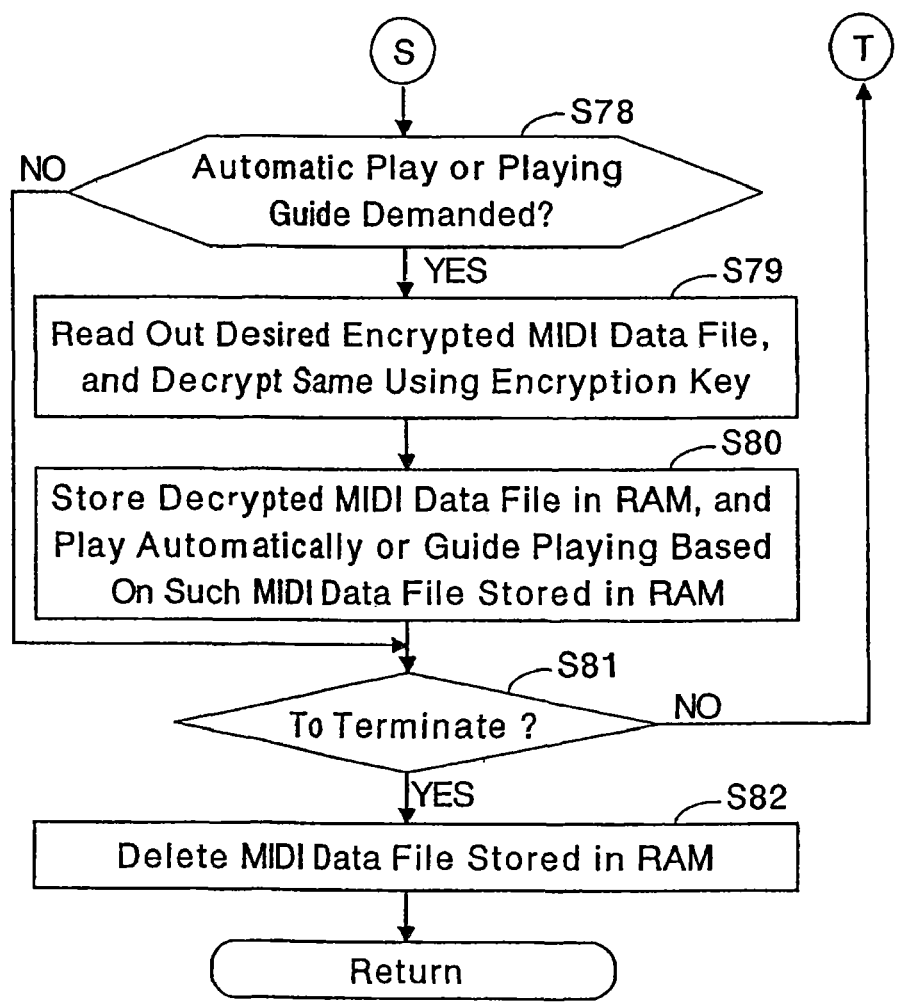

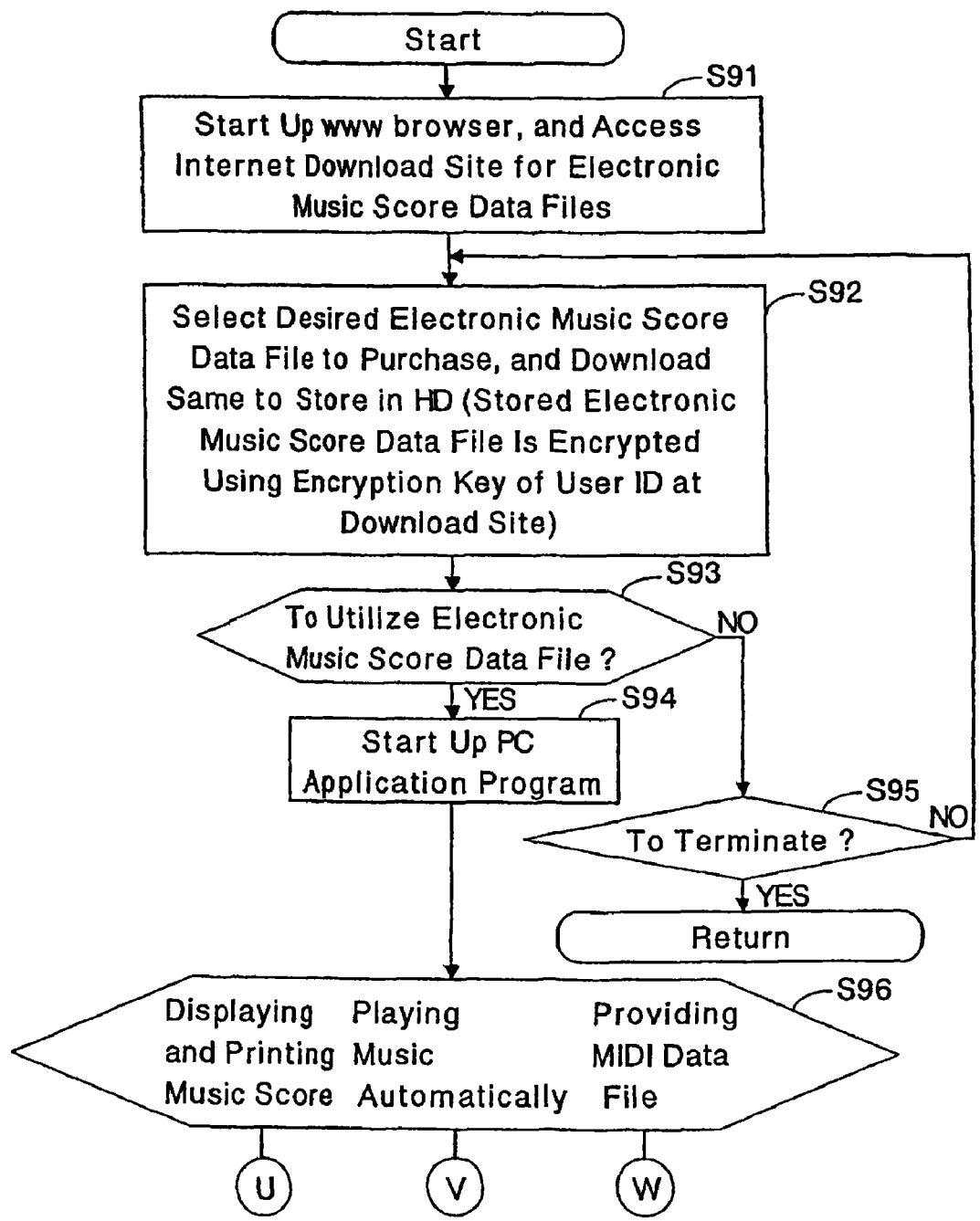
Fig. 5a Downloading Electronic Music Score Data File (Part 1)

Fig. 5b Downloading Electronic Music Score Data File (Part 2)
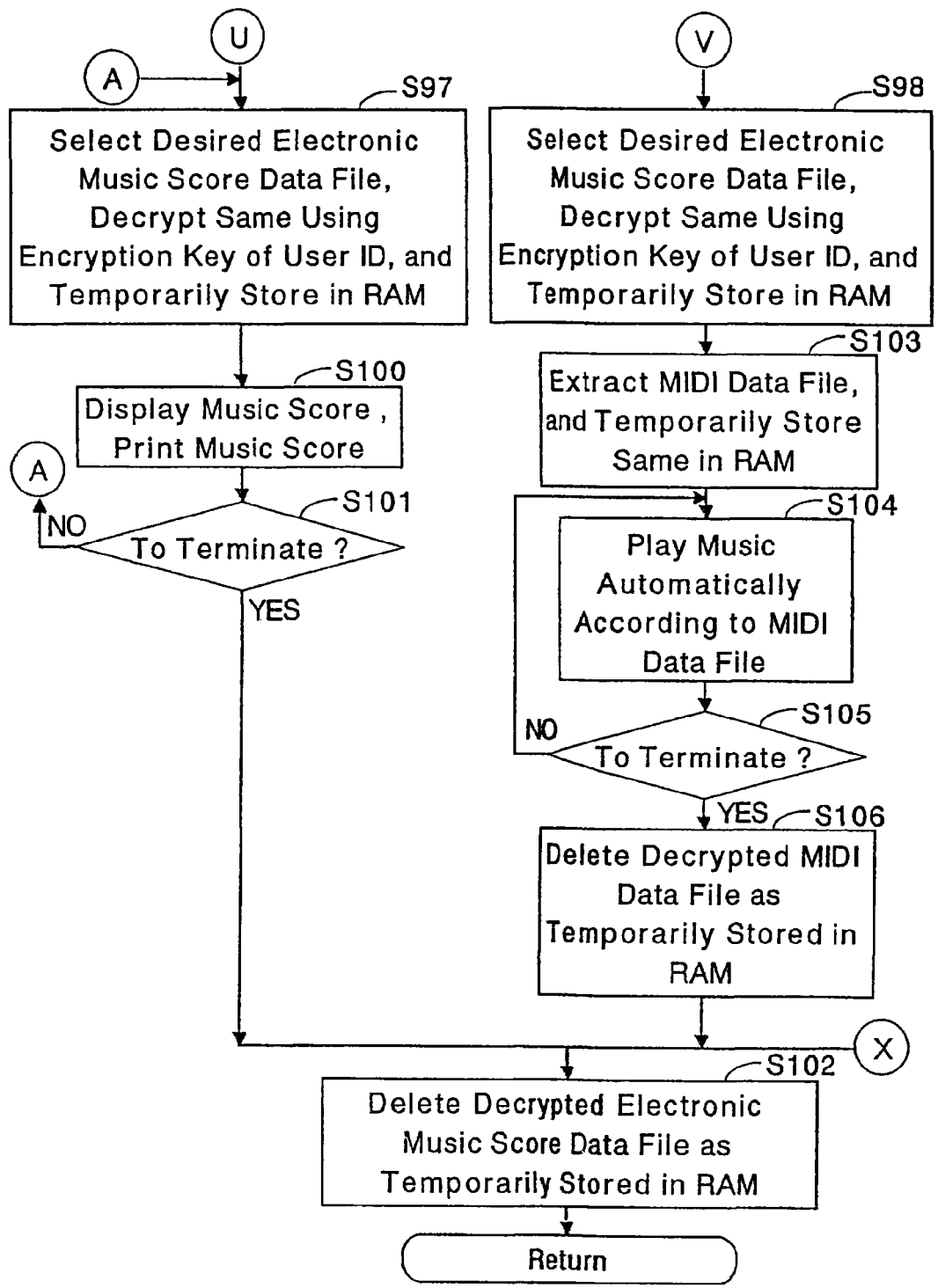

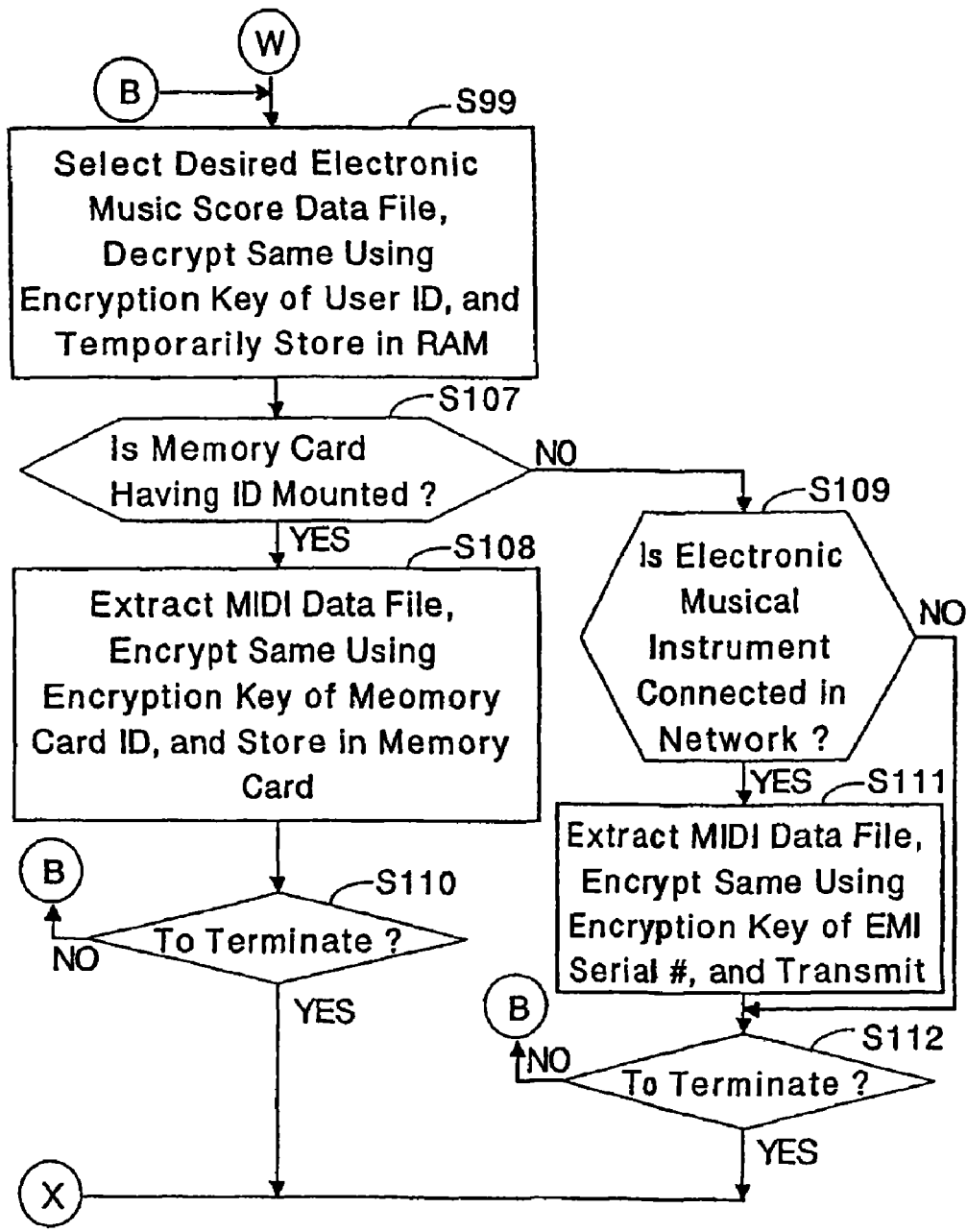
Fig. 5c Downloading Electronic Music Score Data File (Part 3)

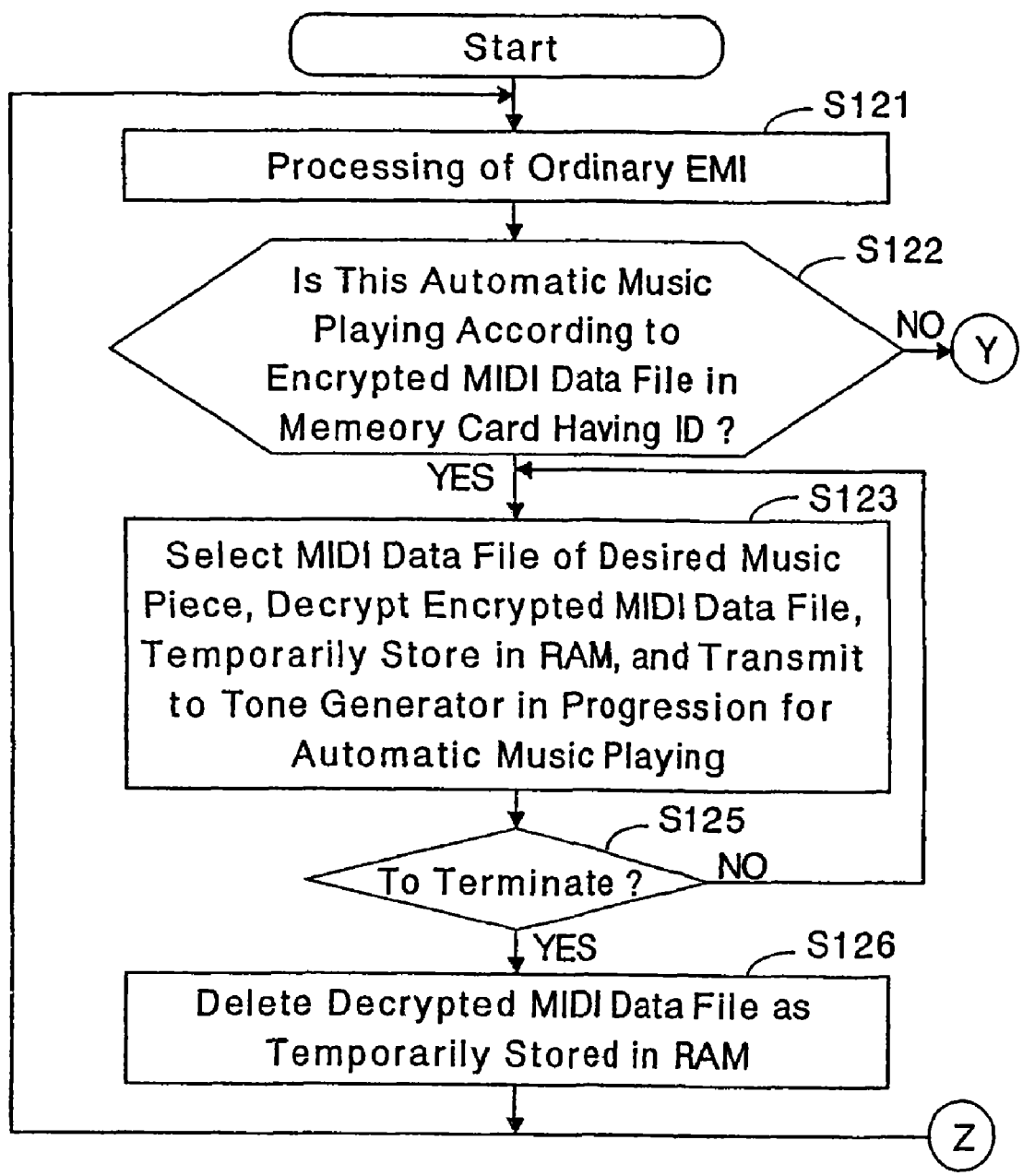
*Fig. 6a* EMI Processing (Part 1)

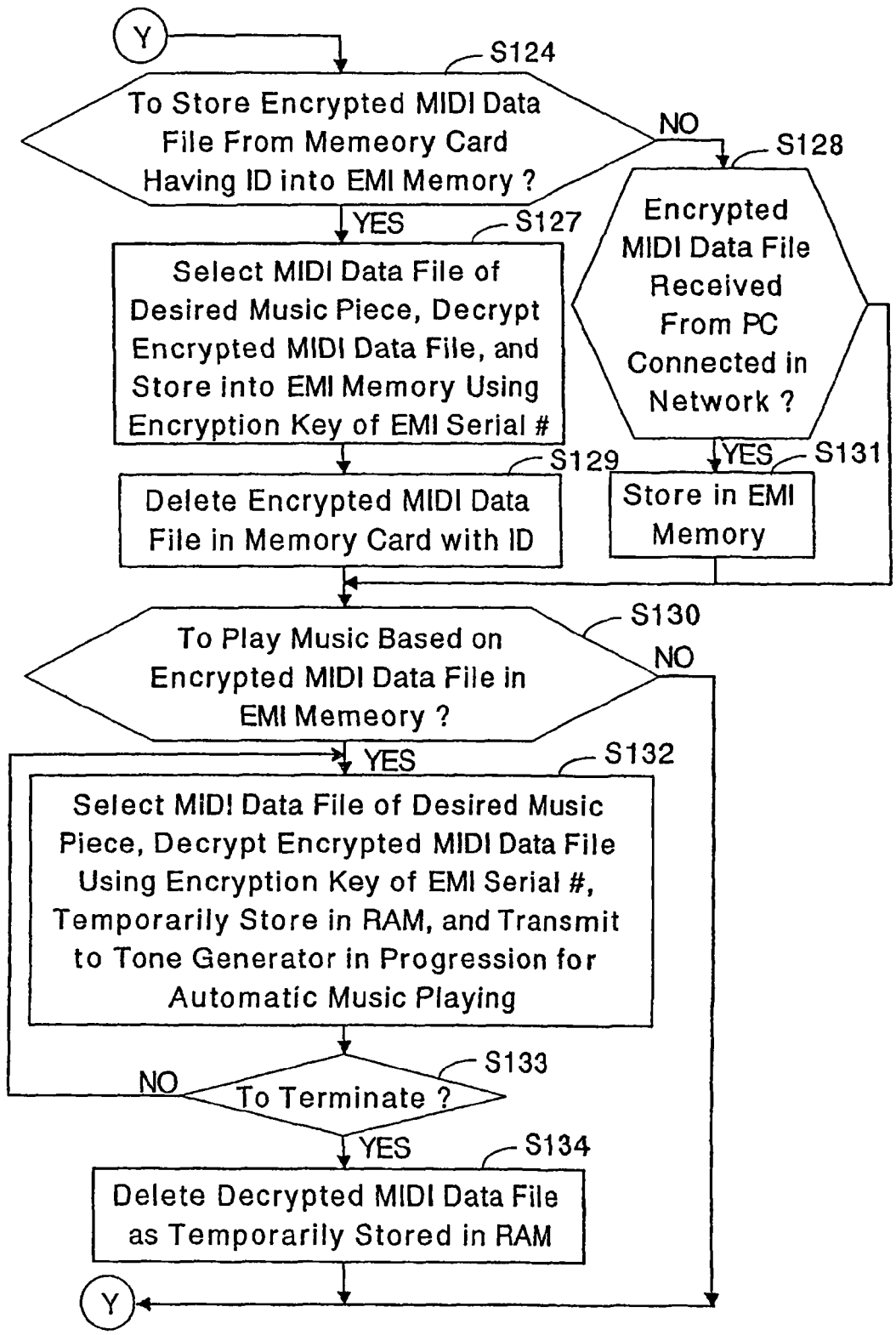
Fig. 6b EMI Processing (Part 2)

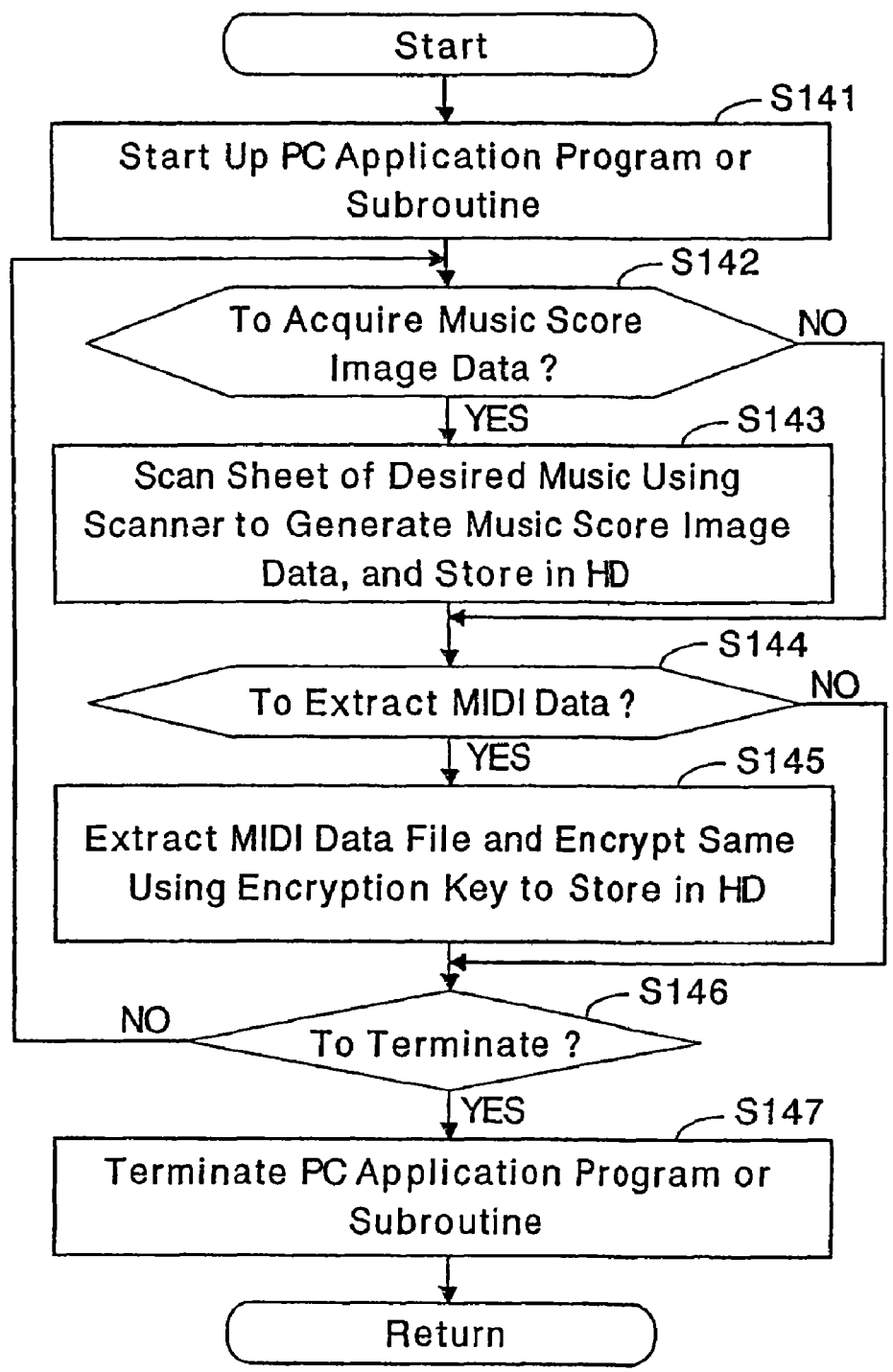
Fig. 7 Extracting MIDI Data File from Sheet of Music

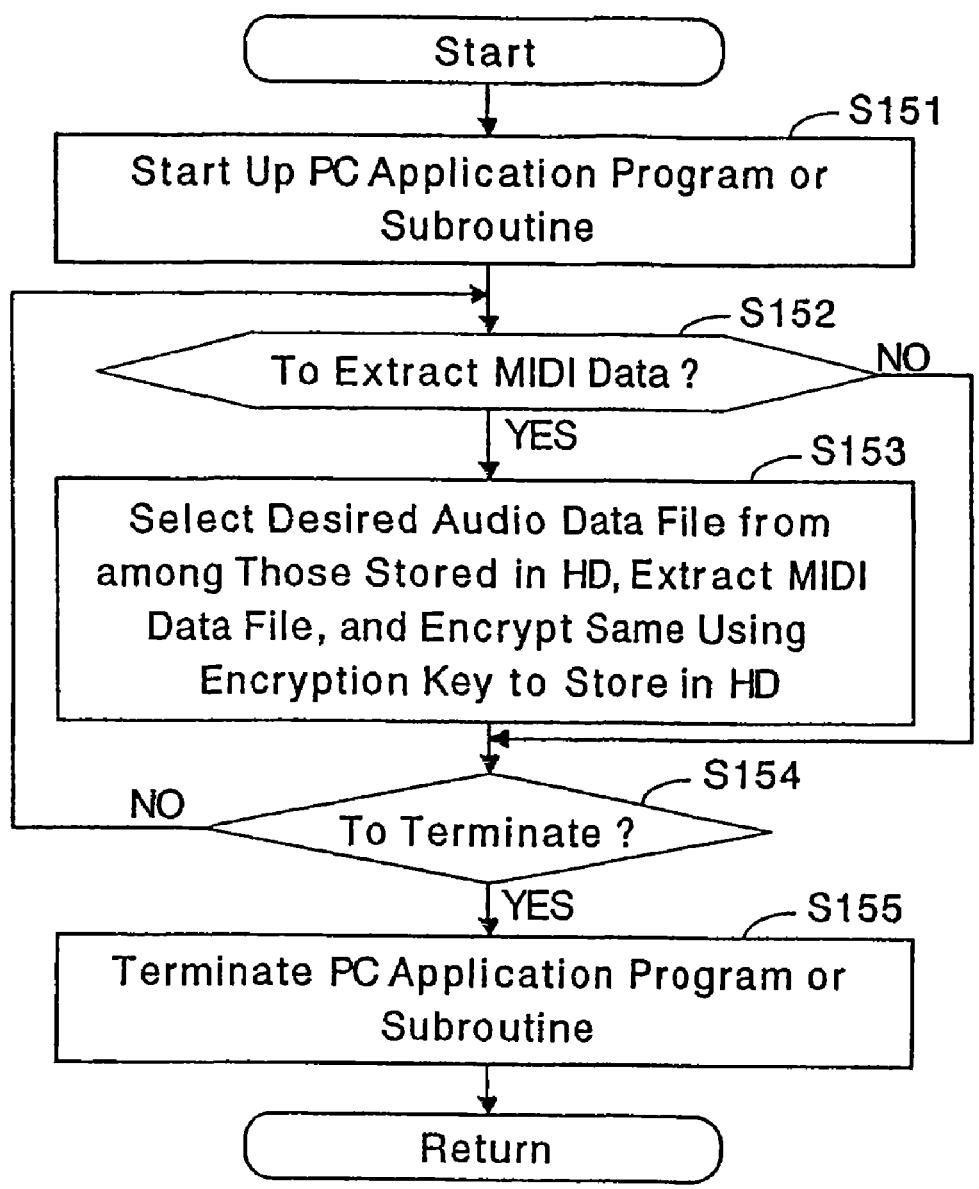
*Fig. 8* Extracting MIDI Data File from Audio Data File

SYSTEM, METHOD AND COMPUTER PROGRAM FOR ENSURING SECURE USE OF MUSIC PLAYING DATA FILES

This is a continuation of application Ser. No. 10/670,157 filed 24 Sep. 2003.

TECHNICAL FIELD

The present invention relates to a system, method and computer program for ensuring secure use of music playing data files, and more particularly to a system, a method and a computer program for utilizing electronic music playing data files as extracted from musical work resources under secure circumstances in which the copyrights are protected properly.

BACKGROUND INFORMATION

There are various types of musical work resources in the art such as electronic data files of music scores, sheets of music pieces and audio signals of performed musical numbers. In order to automatically play music according to such a musical work resource, such a musical work resource will have to be converted to some music playing data file (e.g. MIDI data file) to control a tone generator for generating musical tone signals for a musical performance.

A music score data file is a data file compiled from an existing music score based on predetermined rules according to the musical grammar, and includes data defining notes of the music together with data representing staves, clefs, key signatures, time signatures, tempo marks, dynamic marks, repeat signs, ornamentations, bowing signs, etc. as well as their locations to be exhibited, and also data indicating punctuations of measures, tiers and pages, and also graphical data representing images of the signs and the marks.

By executing a specialized application program, a music score image data file can be composed to display on a display screen or print on a sheet of paper by a printer in a quality close to prevailing music score prints based on such a compiled electronic music score data file. For example, there are services for downloading electronic music score data files according to the ScorchXF™ protocol, and there are also services of providing specialized application programs for displaying or printing music scores based on such an electronic music score data file. See "FREE ScorchXF™ Digital Delivery," at Internet <URL: www.yamahamusicsoft.com/scorch/free_sample.php>, which was actually available on line on Sep. 10, 2002.

A music playing data file such as a MIDI protocol data file can be extracted (and compiled) from the data contained in such an electronic music score data file to represent notes of the music. The MIDI data file also contains data for designating tone generation time points, and can be stored or transmitted in a file format of the SMF (Standard MIDI File) or a file format specific to a sequencer software program. In case a MIDI data file is transmitted in real time, there is no need of data for designating the tone generation time points.

On the other hand, there are OCR application programs with which a scanner converts a printed music sheet into a music score image data file which can be processed by a personal computer so that a music playing data file or performance data file (e.g. MIDI data file) is extracted from the music score image data file. Also known in the art is a method of analyzing a melody part as well as other performance parts with respect to an audio data file as provided by means of an audio compact disc (CD), etc. thereby extracting a music playing data file (e.g. MIDI data file). The use of such programs for extracting a music playing data file (e.g. MIDI data file) from above mentioned various musical work resources will make it readily available for a user to acquire a music playing data file (e.g. MIDI data file) and to copy the same freely.

However, the music work resources such as electronic music score data files, printed music sheets and audio data files are generally under the protection of copyright of lyricists, composers, data compilers, performers, etc. It is, therefore, illegal for a user to freely copy (and so forth) such an extracted music playing data file without permission. Even if the extraction of a music playing data file is permitted by the copyright owner of the original music, what is permitted to the person who has purchased the provided music data file is to use or copy the performance data file for personal use only, and not to bulletin on a web site or to deliver to other people. Thus, there is a need for an electronic music data handling system in which a music playing data file as extracted from a provided musical work resource should not be copied and used freely.

SUMMARY OF THE INVENTION

It is, therefore, a primary object of the present invention to provide a system, a method and a computer program for utilizing electronic music playing data files as extracted from musical work resources under secure circumstances in which the copyrights are protected properly.

According to an aspect of the present invention, the object is accomplished by providing an electronic musical system comprising: a music playing data extracting device which extracts a music playing data file from a given music work resource; an encrypting device which encrypt the extracted music playing data file using an encryption key; a storing device which stores the encrypted music playing data file; a decrypting device which decrypt the encrypted music playing data file from the storing device using a decryption key which corresponds to the encryption key; and an automatic music playing device which plays music of the given music work resource based on the decrypted music playing data file. Thus the present invention ensures a secure utilization of a music playing data file which is extracted from a given music work resource in view of proper copyright protection in recording the data file, and in playing music. The music work resources may be of any kinds as long as it contain data elements for compiling a music playing data file, and include electronic music score data file, a sheet of music and an audio data file of a musical performance. The music playing data extracting device, the encrypting device, the storing device, the decrypting device and the automatic music playing device may be incorporated in a single console or may be placed at separate locations configuring a cooperative system. The storing device may be a writable and readable hard disk drive or flash memory, or may be a removable memory card or a flexible magnetic disk. The cryptosystem may be either the secret-key cryptosystem in which the key for encryption and the key for decryption are the same, or the public key cryptosystem in which the key for encryption and the key for decryption are different.

According to another aspect of the present invention, the object is accomplished by providing a method for ensuring secure use of a music playing data file comprising: a step of extracting a music playing data file from a given music work resource; a step of encrypting the extracted music playing data file using an encryption key; a step of storing the encrypted music playing data file; a step of decrypting the encrypted music playing data file as stored in the step of storing using a decryption key which corresponds to the encryption key; and a step of automatically playing music of the given music work resource based on the decrypted music playing data file.

According to an additional aspect of the present invention, the object is accomplished by providing an electronic musical system, wherein the automatic music playing device renders the decrypted music playing data file unutilizable after the music playing device has played music of the given music work resource. Thus the present invention ensures a more secure utilization of a music playing data file, as an unencrypted music playing data file will not remain in the system after the use has been completed.

According to a further additional aspect of the present invention, the object is accomplished by providing an electronic musical system, wherein the given music work resource is in an encrypted condition, and the music playing data extracting device decrypts the given music work resource in the encrypted condition before extracting the music playing data file. Thus the present invention ensures a more secure handling of the music work resource.

According to a further additional aspect of the present invention, the object is accomplished by providing an electronic musical system, wherein the music playing data extracting device renders the decrypted given music work resource unutilizable after the music playing data extracting device has extracted the music playing data file from the encrypted given music work resource. Thus the present invention ensures a secure copyright protection of the music work resource.

According to a still further aspect of the present invention, the object is accomplished by providing a computer program for ensuring secure use of a music playing data file, the program comprising program instructions for a computer to execute: a step of extracting a music playing data file from a given music work resource; a step of encrypting the extracted music playing data file using an encryption key; and a step of storing the encrypted music playing data file. Thus the present invention can configure an electronic musical system, using a computer, for ensuring a secure use of music work resources in view of proper copyright protection.

BRIEF DESCRIPTION OF THE DRAWINGS

For a better understanding of the present invention, and to show how the same may be practiced and will work, reference will now be made, by way of example, to the accompanying drawings, in which:

FIGS. 1a and 1b, in combination, are a block diagram illustrating a system configuration of a system for ensuring secure use of electronic musical data according to an embodiment of the present invention;

FIG. 2 is a block diagram illustrating a system configuration of another system for ensuring secure use of electronic musical data according to an embodiment of the present invention;

FIG. 3 is a block diagram showing an example of a personal computer used in an embodiment of the present invention;

FIGS. 4a and 4b, in combination, are a flow chart describing an application program executed in a personal computer according to an embodiment of the present invention;

FIGS. 5a, 5b and 5c, in combination, are a flow chart describing the processing for downloading an electronic music score data file according to an embodiment of the present invention;

FIGS. 6a and 6b, in combination, are a flow chart describing the processing for automatically playing music and storing a data file upon receipt of an electronic music playing data file as conducted in an electronic musical instrument according to the present invention;

FIG. 7 is a flow chart describing the processing for extracting a MIDI data file from a sheet of music, encrypting the extracted MIDI data file, and storing the encrypted MIDI data file; and FIG. 8 is a flow chart describing the processing for extracting a MIDI data file from an audio data file, encrypting the extracted MIDI data file, and stoning the encrypted MIDI data file.

DETAILED DESCRIPTION OF EMBODIMENTS OF THE INVENTION

Shown in FIGS. 1a and 1b in combination is a block diagram illustrating a system configuration of a system for ensuring secure use of electronic musical data according to an embodiment of the present invention. The shown system is configured by a personal computer and associated peripheral devices, in which a music playing data file is extracted from a given musical work resource and is utilized for automatic music playing and for transferring to another device or system.

Referring to FIGS. 1a and 1b, a contents server 1 provides services to supply electronic music score data files. A personal computer 2 purchases an electronic music score data file from the contents server 1 via the Internet 3 and download the same for use at the personal computer 2, for example by displaying a music score on the display screen 4 and by printing a music sheet score using the printer 5. The personal computer 2 also acquires a music score image data file from a sheet of music by means of a scanner 6 and an audio data file from an audio apparatus such as a CD player 7.

The personal computer 2 extracts a music playing data file (e.g. MIDI data file) from the electronic music score data file, the music score image data file or the audio data file. In this context, to extract a music playing data file means to gather necessary data from the source data file and compile a music playing data file. The extracted music playing data file is encrypted in the personal computer 2, and the encrypted music playing data file in turn is transferred to an electronic musical instrument 31 (shown in FIG. 2) via a memory card 8 having an ID code or via a transmission line 9. And in the case as shown in FIG. 1, the extracted music playing data file is utilized to perform automatic music playing by an automatic music player 25 so that the generated musical tones are emitted as audible sounds from a loudspeaker 10. Further, an electronic music score data file can be composed from the music playing data file so that the music score is displayed on the display screen 4 with an indication of the next note progressing synchronous with the running automatic music playing to guide the user in playing.

In the embodiment shown in FIG. 1, the electronic music score data file is supplied in an encrypted condition. The contents server 1 encrypts music score data files from the electronic music score database 11 through an encryptor 12 before providing to the Internet 3. The personal computer 2 downloads an encrypted music score data file into an encrypted music score data storage 13 such as a hard disk. As the music score data file is encrypted, it is downloaded in a secure condition in terms of copyright. In order that the music score data can be utilized in the personal computer, the encrypted music score data file is decrypted (decoded) by a decryptor 14 to be temporarily stored in an unencrypted music score data storage 15 such as a random access memory (RAM). A first type example of an encryption key to be used in encryption and decryption is an identification number uniquely assigned to an individual user or an individual personal computer. A second type example is a license key given by the contents server 1 or an encryption key issuing server (not shown) along with an individual electronic music score data file to be purchased. The both types will be simply referred to as a "user ID" hereinafter.

The electronic music score data file temporarily stored in the unencrypted electronic music score data storage 15 is subjected to extraction of music playing data file in a MIDI data extractor 16. On completion of the extraction of the music playing data file, the electronic music score data file remaining in the unencrypted music score data storage 15 will be deleted or else so that the unencrypted music score data file will not be utilizable any more. The unencrypted electronic music score data storage 15 may not necessarily be provided, or the remaining unencrypted electronic music score data file may be temporarily stored in the condition that it cannot be accessed by a user. In such situations, the deletion of the same may not be necessary. The decrypted electronic music score data file has only to be unutilizable. Also after the decrypted electronic music score data file has been utilized by the display device 4 or the printer 5, the decrypted data file will be made unutilizable.

An encrypted electronic music score data file may sometimes be accompanied with a restriction on number of times the display displays or number of times the printer prints. In such a situation, the user ID is controlled so that the user of the personal computer 2 cannot access the user ID any more. Depending on the mode of a service, an electronic music score data file per se is not encrypted, and will be downloaded into the unencrypted electronic music score data storage 15.

A music playing data file can also be extracted from a music score image data file inputted from the scanner 6. In this case, the music score image data file is stored in an unencrypted music score image data storage 17 such as a hard disk (HD) and will in turn be subjected to extraction of a music playing data file at a MIDI data extractor 18. In order that a music playing data file is extracted from an audio data file of a music performance inputted from the CD player 7, the audio data file is stored in an unencrypted audio data storage 19 such as a hard disk (HD) and will in turn be subjected to extraction of a music playing data file at a MIDI data extractor 20.

The music playing data files outputted from the MIDI data extractors 16, 18 and 20, respectively, are encrypted at an encryptor 21 (FIG. 1b) and then the encrypted data files are stored in an encrypted MIDI data storage 22 such as a hard disk (HD). When a stored music playing data file is utilized, the stored data file is read out and then decrypted (decoded) at a decryptor 23, and the decrypted music playing data file is stored in an unencrypted MIDI data storage 24. The encryption key to be used at the encryptor 21 and the decryptor 23 can be determined, for example, between the contents server and the user. It may be the above mentioned user ID, and may be the serial number identifying the individual personal computer.

As an example of the utilization of the music playing dada file, the case of automatic music playing will be described hereinbelow. The automatic music player 25 generates tone signals by means of a tone generator included therein (not shown) based on the music playing data file read out from the unencrypted MIDI data storage 24, and outputs musical sounds from the loudspeaker 10. After the automatic music playing has be completed, the unencrypted music playing data file residing in the unencrypted MIDI data storage 24 will be deleted or else so that the unencrypted music playing data file cannot be utilized any more. The unencrypted MIDI data storage 24 may not necessarily be provided, or the remaining unencrypted MIDI data file may be temporarily stored in the condition that it cannot be accessed by a user. In such situations, there is no need of deleting the same.

The music playing data files outputted from the MIDI data extractors 16, 18 and 20, respectively, are stored in the unencrypted MIDI data storage 24 and are utilized at the automatic music player 25 as mentioned above, and in addition are transmitted to an encryptor 26 to be encrypted again before being stored in the memory card 8 having an ID code and being inserted in the card slot of the personal computer 2, or before being outputted via an interface to the transmission line 9. The music playing data file stored in the encrypted MIDI data storage 22 may be decrypted by the decryptor 23, and in turn transmitted to the encryptor 26 to be transmitted to an electronic musical instrument 31 (FIG. 2) via the transmission line 9.

The memory card 8 having an ID code is removed from the card slot of the personal computer 2, and is in turn inserted in a card slot of the electronic musical instrument 31 to supply the music playing data file to the electronic musical instrument 31. The ID-affixed memory card 8 is a memory card comprised, for example, of a flash memory such as an ID-affixed "Smart Media™." For the copyright protection, individual memory cards each has its unique identification number of 128 bits written therein. Where a music playing data file is supplied to the electronic musical instrument 31 by means of an ID-affixed memory card 8, the encryptor 26 (FIG. 1b) and a decryptor 32 (FIG. 2 to be described later) may use the memory card ID as the encryption key.

On the other hand, where an encrypted music playing data file is outputted to the transmission line 9, the encrypted music playing data file is supplied to the electronic musical instrument 31 of FIG. 2 via interfaces. In such an instance, the encryptor 26 may use, for example, EMI (electronic musical instrument) product serial number as the encryption key. The personal computer 2 can acquire the EMI serial number automatically according to the communication protocol between the electronic musical instrument 31 and the personal computer 2. The communication line 9 may be a directly connecting cable such as an RS-232C cable, or may be either a wired or a wireless LAN (local area network). Also utilizable is a wide area network (WAN) such as a telephone network. Interface cards of CSMA/CD (carrier sense multiple access with collision detection) protocol are sometimes given respectively unique MAC (media access control) address, and such a MAC address may be used as an encryption key.

Shown in FIG. 2 is a block diagram illustrating a system configuration of another system for ensuring secure use of electronic musical data according to an embodiment of the present invention The shown system is configured by an electronic musical instrument and associated peripheral devices, in which an encrypted music playing data file is received and utilized for playing music automatically and for displaying a music score.

Referring to FIG. 2, the encrypted music playing data file as supplied by the ID-affixed memory card 8 is decrypted by the decryptor 32, and the decrypted data file in turn is temporarily stored in an unencrypted MIDI data storage 33. The music playing data file read out from the unencrypted MIDI data storage 33 is supplied to an automatic music player 34, which generates musical tones by means of a tone generator (not shown) and the musical tones thus generated are emitted as audible sounds by a loudspeaker 35. The electronic musical instrument may be provided with additional functions such as a keyboard playing guide which illuminates the keys to depress successively according to the music playing data and an music score data generation by an electronic music score generator 39 from the music playing data file, wherein the music score is displayed on the display screen 40 with an indication of current progressing time point on the score in synchronism with the progression of the automatic music playing to serve as a playing guide.

The decrypted music playing data from the decryptor 32 may be encrypted again at an encryptor 36 to be store in an encrypted MIDI data storage 37. In connection with this procedure, the encrypted music playing data file which is stored in the ID-affixed memory card 8 will be deleted to prevent illegal copy (reproduction). When the music playing data file stored in the encrypted MIDI data storage 37 is to be utilized, the read-out data file is decrypted at the decryptor 38 and is transmitted to the unencrypted MIDI data storage 33. The encryptor 36 and the decryptor 38 may use an encryption key of the EMI product serial number in encrypting and decrypting, respectively.

In case the encrypted music playing data file is supplied via the transmission line 9 where the same encryption key as used in the encryptor 36 in the electronic musical instrument 31, for example, the EMI product serial number, the transmitted encrypted music playing data file may not pass through the decryptor 32 and the encryptor 36, but may be supplied directly to the encrypted MIDI data storage 37. Also where a memory card containing encrypted data file with an encryption key of EMI product serial number is uses in place of the above mentioned ID-affixed memory card 8, the encrypted data file may likewise be directly supplied to the encrypted MIDI data storage 37. The electronic musical instrument 31 may be of the type which permits the registration of the owner's name, then such owner's name may be used as the encryption key.

In the systems configured as shown in FIGS. 1a and 1b and FIG. 2, the music playing data files are stored in the encrypted condition in the encrypted MIDI data storage 22, the ID-affixed memory card 8 and the encrypted MIDI data storage 37, and therefore even though the user or a third party might copy the music playing data file stored in the encrypted MIDI data storage 22 into some external storage device, such an external device having neither decryptor nor same encryption key could not decrypt the encrypted data file, which means the music playing data file shall not be freely used or freely copied by the user or a third party for an automatic music playing. Thus, the copyright of the music work resource is securely protected.

As the personal computer 2 supplies the music playing data file as extracted by the MIDI data extractor 16, etc. to the electronic musical instrument 31 after encrypting the data file at the encryptor 26, a third party's external device having neither an decryptor nor the same encryption key could not decrypt the data file, even though some external device might be connected to the personal computer 2 to receive the music playing data file. Thus, the user or a third party cannot freely use or copy the music playing data file for an automatic music playing. If the encryption key is controlled to be secret even to the user, the security for copyright protection will be further increased.

The personal computer 2 may function simply as a communication interface, and the electronic musical instrument 31 may access the contents server 1 directly, so that a music playing data file may be extracted within the electronic musical instrument. Alternatively, the contents server 1 which provides music work resources from the contents database 11 may extract and encrypt the music playing data files before serving, and the personal computer 2 may take the roles of encrypting, decrypting and automatic music playing.

FIG. 3 is a block diagram showing an example of a personal computer used in an embodiment of the present invention. In the Figure, like parts or elements as in FIGS. 1a, 1b and 2 are given like reference numerals. A bus 51 interconnects a CPU (central processing unit) 52, a RAM (random access memory) 53, a ROM (read-only memory) 54, a keyboard or mouse (having controls) 55, a tone generator 56 connected with a sound system 57, external storage devices 58 such as a hard disk drive, a CD-ROM drive and a memory card writer/reader), and interfaces 59 as well as the display 4, the printer 5 and the scanner 6. The interfaces 59 connect the bus 51 to various external devices including the electronic musical instrument 31 via a short distance direct cable or a LAN (local area network), or to the contents server 1 via the Internet.

Under the control of the OS program, the CPU loads the application program stored in the hard disk in the external storage device 58 into the RAM 53, and controls, according to the application program, downloading electronic music score data files, acquiring image data files and audio data files, extracting music playing data files from music work resources in various styles, and encrypting, storing, decrypting music playing data files, automatic music playing, and supplying music playing data files to the electronic musical instrument. The processing of these functions is performed by linked operations of plural application programs or of plural subroutine programs. Those programs will be supplied from CD-ROMs or memory cards in the external storage devices 58 or will be downloaded from outside servers including the contents server 1.

The tone generator 56 generates musical tone signals according to the music playing data file as extracted from a music work resource, and the generated musical tone signals are sent to the sound system 57, in which audible sounds will be emitted from a loudspeaker (not shown in FIG. 3). The function of the tone generator may be accomplished by the CPU 52 executing a tone generation program to constitute a software tone generator. Although the hardware configuration of the electronic musical instrument 31 of FIG. 2 is omitted in the drawings, it has a similar configuration as the personal computer 2 of FIG. 3, with the printer and the scanner being not connected. Like the keyboard and mouse control 55 in FIG. 3, the electronic musical instrument 31 has a manual keyboard, a pedal keyboard, push button switches and variable controls on the control panel, etc. Like the external storage devices 58 in FIG. 3, the electronic musical instrument 31 may comprise an internal flash memory, an ID-affixed memory card, etc.

FIGS. 4a through 8 are flow charts describing operations in embodiments of data processing according to the present invention, in which FIGS. 4a and 4b, in combination, show an overall flow chart describing an application program executed in a personal computer 2 in FIGS. 1a and 1b, including the processing of extracting a MIDI data file from an electronic music score data file, encrypting the MIDI data file and storing the encrypted MIDI data file into a hard disk (as the encrypted MIDI data storage 22 in FIG. 1b); FIGS. 5a, 5b and 5c, in combination, show a flow chart describing the processing for downloading an electronic music score data file conducted at the step S73 in FIG. 4a as well as supplying a music playing data file to the electronic musical instrument 31 of FIG. 2; FIGS. 6a and 6b, in combination, show a flow chart describing the processing conducted in the electronic musical instrument 31 of FIG. 2 for automatically playing music and storing the data file upon receipt of an electronic music playing data file as obtained in the processing of FIGS.

5a, 5b and 5c; FIG. 7 shows a flow chart describing the processing for extracting a MIDI data file from a sheet of music, encrypting the extracted MIDI data file, and storing the encrypted MIDI data file into a hard disk (as the encrypted MIDI data storage 22 in FIG. 1b) as conducted at the step S74 in FIG. 4; and FIG. 8 shows a flow chart describing the processing for extracting a MIDI data file from an audio data file, encrypting the extracted MIDI data file, and stoning the encrypted MIDI data file into a hard disk (as the encrypted MIDI data storage 22 in FIG. 1b) as conducted at the step S75 in FIG. 4.

First referring to FIGS. 4a and 4b, a step S71 judges whether the extraction of a music playing data file (e.g. a MIDI data file) is demanded by detecting an operation event among the controls 55 such as a keyboard and a mouse in FIG. 3. When there is a demand of extracting a MIDI data file, a step S72 judges whether the demand is to extract a MIDI data file from an electronic music score data file or from a sheet of music (a music score image data file) or from an audio data file, and then the process flows to a step S73 or a step S74 or a step S75, accordingly. The step S73 is a subroutine process of downloading an electronic music score data file, which process will be described in more detail with reference to FIG. 5 herein later. A step S76 is to select a desired electronic music score data file from among a plurality of music score data files stored in the hard disk (HD) (corresponding to the encrypted music score data storage 13 in FIG. 1a). A step S77 decrypts the encrypted music score data file as selected, extracts a MIDI data file, encrypts the extracted MIDI data file using an encryption key, and stores thus encrypted MIDI data file into the HD (as the encrypted MIDI data storage 22 in FIG. 1b).

The step S74 is a subroutine process of extracting a MIDI data file, which process will be described in more detail with reference to FIG. 7 herein later. The step S74 is a subroutine process of extracting a MIDI data file of the melody part from an audio data file, which process will be described in more detail with reference to FIG. 8 herein later. Both the process are somewhat similar to the process through the steps S73, S76 and S77.

Turning to FIG. 4b, a step S78 judges whether automatic music playing or music playing guidance is demanded. Where there is such a demand, a step S79 reads out a desired encrypted MIDI data file from the HD (corresponding to the encrypted MIDI data storage 22 in FIG. 1b) and decrypts the encrypted MIDI data file using an encryption key. A step S80 then stores the decrypted MIDI data file into the RAM (corresponding to the unencrypted MIDI data storage 24 in FIG. 1b), and conducts automatic playing of the music or conducts music playing guidance according to the MIDI data file. A step S81 judges whether there is a demand to terminate the automatic music playing, and in the case the answer is affirmative (YES), a step S82 deletes the MIDI data file stored in the RAM before returning the process flow to the main routine of the application program (not shown). When the automatic music playing is not to be terminated, the process flow goes back to the step S71 (FIG. 4a).

In FIG. 5a, a step S91 starts up the www browser and accesses an Internet download site (in the contents server 1 of FIG. 1a) for electronic music score data files. At a step S92, the user selects a desired electronic music score data file and make a demand to purchase the selected one, then the contents server 1 in turn places the nominated electronic music score data file into the purchase list and conducts the charging process. Upon demand from the personal computer 2, the contents server 1 delivers the electronic music score data file. The personal computer 2 downloads the same, and stores in the hard disk HD (corresponding to the encrypted electronic music score data storage 13 in FIG. 1a).

A step S93 judges whether there is a demand of using the electronic music score data file, and if the answer is affirmative (YES), the process proceeds to a step S94 to start up a PC application program or a subroutine as designated at a step S96. If the answer in negative (NO), the process goes to a step S95 to judge whether the termination is demanded or not. If the termination is demanded, the process flow returns to the step S76 in FIG. 4a, and if not, the process flow is directed back to the step S92 for the selection and purchase of another electronic music score data file. The above described application program may be an independent one from the www browser, or may be its plug-in software program. The step S96 directs the processing to a step S97 or a step S98 or a step S99, according to the intended function among displaying or printing a music score, playing music automatically and providing the MIDI data file to the electronic musical instrument 31.

Turning now to FIG. 5b, a step S97 selects a desired electronic music score data file from among a plurality of electronic music score data files stored in the HD (corresponding to the encrypted electronic music score data storage 13 in FIG. 1a), and decrypts the selected data file using an encryption key of the user ID, and temporarily stores the decrypted data file into the RAM (corresponding to the unencrypted electronic music score data storage 15 in FIG. 1a). A step S100 then displays or prints the music score according to the user's demand. If the processing is to be terminated, a step S101 directs the process flow to a step S102 to delete the decrypted electronic music score data file as temporarily stored in the RAM (corresponding to the unencrypted MIDI data storage 24 in FIG. 1b) before returning to FIG. 4a.

A step S98 conducts the same processes as the step S97. Then, a step S103 extracts a MIDI data file from the decrypted music score data file and temporarily stores the extracted MIDI data file into the RAM (corresponding to the unencrypted MIDI data storage 24 in FIG. 1b. A step S104 plays music automatically according to the MIDI data file. If the automatic music playing function is to be terminated, a step S105 directs the process flow to a step S106 to delete the decrypted MIDI data file as temporarily stored in the RAM (corresponding to the unencrypted MIDI data storage 24 in FIG. 1b before going to the step S102.

Turning to FIG. 5c, a step S99 conducts the same processes as the step S97. A step S107 judges whether a memory card 8 (FIG. 1a) having an ID code is mounted to the personal computer 2, and if affirmative (YES), the process moves forward to a step S108 to extract a MIDI data file from the electronic music score data file as temporarily stored in the RAM, to encrypt the extracted MIDI data file using an encryption key of the ID code of the ID-affixed memory card 8 and to store the encrypted MIDI data file into the memory card 8 having an ID code. If the processing for supplying a MIDI data file to the electronic musical instrument 31 is to be terminated, a step S110 directs the process flow to the step S102.

If the ID-affixed memory card 8 is not inserted at the step S107, a step S109 judges whether the electronic musical instrument 31 is connected in the network. If so, the process moves forward to a step S111 to extract a MIDI data file from the electronic music score data file as temporarily stored in the RAM (corresponding to the unencrypted electronic music score data storage 15 in FIG. 1a), to encrypt the extracted MIDI data file using an encryption key of the EMI product serial, and transmits the encrypted MIDI data file via the transmission line 9 (FIGS. 1b and 2). When the function of supplying a MIDI data file to the electronic musical instrument 31 is to be terminated, the process goes forward to the step S102 before returning to the processing of FIG. 4. While the decrypted electronic music score data file as temporarily stored in the RAM (corresponding to the unencrypted electronic music score data storage 15 in FIG. 1*a*) is deleted at the step S102 in the above description, the unencrypted electronic music score data file should preferably be deleted immediately after the completion of the extraction of the MIDI data file in the respective processing for displaying or printing a music score, for playing music automatically and for providing a MIDI data file, so that an unencrypted electronic music score data file is to be deleted as soon as it has become unnecessary.

Referring to FIGS. 6*a* and 6*b*, the processing for the electronic musical instrument 31 will be described in detail herein below. A step S121 (FIG. 6*a*) is the processing of an ordinary electronic musical instrument, and further description will be omitted. A step S122 judges whether an automatic music playing according to an encrypted MIDI data file as stored in the ID-affixed memory card 8 is demanded or not. If the judgment proves affirmative (YES), the process proceeds to a step S123, while negative (NO), the process goes to a step S124 (FIG. 6*b*). The step S123 selects a MIDI data file of a desired music piece, decrypts the encrypted MIDI data file, temporarily stores the decrypted MIDI data file into the RAM (corresponding to the unencrypted MIDI data storage 33 in FIG. 2), and transmits to the tone generator in progression for automatic music playing. If the termination of the automatic music playing according to the memory card 8 having an ID code is demanded, a step S125 directs the process flow to a step S126 to delete the decrypted MIDI data file as temporarily stored in the RAM (corresponding to the unencrypted MIDI data storage 33 in FIG. 2) before the process goes back to the step S121.

When the process comes to the step S124 (FIG. 6*b*), a judgment is made as to whether there is a demand to store the encrypted MIDI data file from the ID-affixed memory card 8 into the memory (e.g. a flash memory corresponding to the encrypted MIDI data storage 37 in FIG. 2) in the electronic musical instrument 31 or not. If the judgment proves to be affirmative (YES), the process moves forward to a step S127, while negative (NO), to a step S128. The step S127 selects a MIDI data file of a desired music piece, decrypts the encrypted MIDI data file, and store the decrypted MIDI data file into the EMI memory using an encryption key of the EMI product serial number. Then, a step S129 deletes the encrypted MIDI data file in the ID-affixed memory card 8 before the process goes to a step S130. The step S128 judges whether an encrypted MIDI data file is received from the personal computer 2 connected in the network, and if the answer is affirmative (YES), a step S130 stores the received data file in the EMI memory before the process goes to the step 130.

The step S130 judges whether there is a demand to play music based on the encrypted MIDI data file in the EMI memory. If the judgment proves to be affirmative (YES), the process goes forward to a step S132, while negative (NO), back to the step S121 (FIG. 6*a*). The step S132 selects a MIDI data file of a desired music piece, decrypts the selected encrypted MIDI data file using the encryption key of the EMI product serial number, temporarily stores the decrypted MIDI data file into the RAM (corresponding to the unencrypted MIDI data storage 33 in FIG. 2), and sequentially supplies to the tone generator to play music automatically. If there is a demand to terminate the automatic music playing according to the ID-affixed memory card 8, a step S133 directs the process flow to a step S134 to delete the decrypted MIDI data file as temporarily stored in the RAM (corresponding to the unencrypted MIDI data storage 33 in FIG. 2) before the process goes back to the step S121.

FIG. 7 shows a flow chart describing the processing for extracting a MIDI data file from a sheet of music, encrypting the extracted MIDI data file, and storing the encrypted MIDI data file. In FIG. 7, a step S141 starts up an application program or a subroutine program for extracting a MIDI data file from a music score image data file. A step S142 judges whether there is a demand to acquire a music score image data file. If the judgment proves to be affirmative (YES), process moves to a step S143, which scans a sheet of a desired music piece by the scanner 6 to generate a music score image data file and stores the generated music score image data file into the hard disk (HD). Then, a step S144 judges whether there is a demand to extract a MIDI data file. If there is such a demand, the process moves to a step S145, which extracts a MIDI data file, encrypt the extracted MIDI data file using an encryption key, and store the encrypted MIDI data file into the hard disk (HD). In case a step S146 judges that there is a demand to terminate the processing of extracting a MIDI data file from a sheet of music, the process goes forward to a step S147 to terminate the PC application program or the subroutine program for extracting a MIDI data file from a sheet of music, and after the termination, the process returns to the main routine flow of FIG. 4.

FIG. 8 shows a flow chart describing the processing for extracting a MIDI data file from an audio data file, encrypting the extracted MIDI data file, and stoning the encrypted MIDI data file. In FIG. 8, a step S151 starts up an application program or a subroutine for extracting a MIDI data file from an audio data file. A step S152 judges whether there is a demand to extract a MIDI data file from the audio data file. If there is such a demand, the process moves forward to a step S153, which selects a desired audio data file from among a plurality of audio data files stored in the hard disk (corresponding to the unencrypted MIDI data storage 19 in FIG. 1*a*), extracts a MIDI data file, encrypts the extracted MIDI data file using an encryption key, and stores the encrypted MIDI data file into the hard disk (HD) (corresponding to the encrypted MIDI data storage 22 in FIG. 1*a*). A step S154 judges whether there is a demand of terminating the processing of extracting a MIDI data file from an audio data file. If there is such a demand, the process proceeds to a step S155 to terminate the PC application program or subroutine program for extracting a MIDI data file from an audio data file, and the after the termination, the process returns to the main routine flow of FIG. 4.

So far is the description of how the embodiment of the present invention works, as an example of process operation. Some additional description will be made with respect to alternative types of content services.

In the processing flow of FIGS. 5*a*, 5*b* and 5*c*, the contents downloaded to the user's personal computer 2 were electronic music score data files, and the personal computer 2 had roles of displaying or printing a music score and processing contents data files. In an alternative type of contents providing services, the user selects an electronic music score and demands to purchase the same after the step S95 in FIG. 5, then the contents server 1 places the nominated electronic music score into the purchase list and conducts a charging process. The user's personal computer 2 initiates a specific application program for displaying or printing music scores corresponding to the accessed site and issues an instruction to display or prints a music score. The contents server 1 generates a music score image data file based on the electronic music score data file and transmits the generated image data file to the personal computer 2. The personal computer 2 displays a music score on the display screen 4 or prints a sheet of music using the printer 5 as shown in FIG. 5 based on the received music score image data file.

In the case the user selects a desired MIDI data file and demands to purchase the same, the contents server 1 places the corresponding electronic music score data file in the purchase list, and conducts the charging process. When the personal computer 2 starts up a dedicated application program specific to the delivery of MIDI data file from the accessed site, and the user places a demand to download the MIDI data file, the contents server 1 extracts a MIDI data file from the electronic music score data file, encrypts the extracted MIDI data file using an encryption key of the user ID, and delivers the encrypted MIDI data file. The personal computer 2 then stores the received encrypted MIDI data file into the hard disk (HD) (corresponding to the encrypted MIDI data storage 22 in FIG. 1b). When the user wants an automatic playing of the music according to the thus stored MIDI data, the user selects a desired MIDI data file from the hard disk (HD) and has the selected MIDI data file decrypted using the key of the user ID and has the tone generator generate tone signals successively. When the user wants to supply the stored MIDI data to the electronic musical instrument 31, the user will first decrypt the MIDI data file stored in the hard disk, and then, for example, either may store into the ID-affixed memory card 8 (in FIG. 1b) by encrypting the MIDI data file with an encryption key of the memory card ID, or may transmit via the transmission line 9 (in FIG. 1b) after encrypting the MIDI data file with an encryption key of the EMI product serial number.

In the above described embodiment, the encryption keys are: the user ID at the encrypted electronic music score data storage 13 and the encrypted MIDI data storage 22 within the personal computer 2, the electronic musical instrument product serial number at the encrypted MIDI data storage 37 within the electronic musical instrument 31, and the ID code at the memory card 8. However, the encryption key can be arbitrarily selected at each process stage. The individual encryption keys may be different from each other. Or the encryption keys at the encrypted MIDI data storage 22 and at the encrypted MIDI data storage 37 may be the same, such as the EMI product serial number. The encryption algorithms may be different at different process stages.

The above described embodiment is based on the secret-key cryptosystem in which the encryption key and the decryption key are the same, and therefore both the key for encryption and the key for decryption are termed simply as an "encryption key." The cryptosystem, however, may be the public key cryptosystem, in which the key for encryption and the key for decryption are different from each other, although having some correspondence, and the key for encryption is a public key and the key for decryption is a secret key.

As will be apparent from the above description, the present invention provides a great advantage in that the music playing data file extracted from a given music work resource will be utilized under secure conditions in view of copyright protection.

While several forms of the invention have been shown and described, other forms will be apparent to those skilled in the art without departing from the spirit of the invention. Therefore, it will be understood that the embodiments shown in the drawings and described above are merely for illustrative purposes, and are not intended to limit the scope of the invention, which is defined by the appended claims.

What is claimed is:

1. An electronic musical apparatus comprising:
a receiving device that receives a music work resource;
a music playing data extracting device that extracts a music playing data file from the received music work resource;
an encrypting device that encrypts the extracted music playing data file with an encryption key;
a first storing device that stores the encrypted music playing data file;
a decrypting device that decrypts the encrypted music playing data file from the first storing device with a decryption key that corresponds to the encryption key to permit the decrypted music playing data file to be played;
a second storing device that temporarily stores the decrypted music playing data file decrypted by the decrypting device;
an automatic music playing device that automatically plays music by controlling a tone generator for generating musical tone signals for a musical performance based on the temporarily stored decrypted music playing data file from the second storing device; and
a deleting device that deletes the decrypted music playing data file stored in the second storing device after the automatic music playing device plays the decrypted music playing data file stored in the second storing device,
wherein the received music resource is in a data format that is unplayable by the automatic music playing device regardless of whether the received music resource is in a decrypted or encrypted form.

2. The electronic musical system according to claim 1, wherein the received music work resource is encrypted, and the music playing data extracting device decrypts the received encrypted music work resource, extracts the music playing data file from the decrypted music work information source, and deletes the decrypted music work resource after extracting the music playing data file.

3. An electronic musical system comprising:
a music playing data providing apparatus for providing a music playing data file; and
an automatic music playing apparatus for playing music based on the music playing data file,
wherein the music playing data providing apparatus comprises:
a receiving device that receives a music work resource which that is in a data format unplayable by the automatic music playing apparatus regardless of whether the received music resource is in a decrypted or encrypted form;
a music playing data extracting device that extracts a music playing data file from the received music work resource;
an encrypting device that encrypts the extracted music playing data file with an encrypting key; and
a first storing device for storing the encrypted music playing data, and
wherein the automatic music playing apparatus comprises:
a decrypting device that decrypts the encrypted music playing data file from the first storing device with a decryption key that corresponds to the encryption key to permit the decrypted music playing data file to be played by the automatic music playing apparatus;
a second storing device that temporarily stores the decrypted music playing data file decrypted by the decrypting device, wherein the automatic music playing device plays music by controlling a tone generator for generating musical tone signals for a musical performance based on the temporarily stored decrypted music playing data file from the second storing device; and deleting device that deletes the decrypted music playing data file stored in the second storing device after the automatic music playing device plays the decrypted music playing data file stored in the second storing device.

4. The electronic musical system according to claim 3, wherein the received music work resource is encrypted, and the music playing data extracting device decrypts the received encrypted music work resource, extracts the music playing data file from the decrypted music work information source, and deletes the decrypted music work resource after extracting the music playing data file.

5. An electronic musical system comprising:
a music playing data providing apparatus for providing a music playing data file; and
an automatic music playing apparatus for playing music based on the music playing data file,
wherein the music playing data providing apparatus comprises:
a receiving device that receives a music work resource which that is in a data format unplayable by the automatic music playing apparatus regardless of whether the received music resource is in a decrypted or encrypted form;
a music playing data extracting device that extracts a music playing data file from the received music work resource;
a first storing device;
a first encrypting device that encrypts the extracted music playing data file with a first encrypting key and stores the encrypted music playing data into the first storing device, and
wherein the automatic music playing apparatus comprises:
a first decrypting device that decrypts the encrypted music playing data file from the first storing device with a decryption key that corresponds to the encryption key;
a second encryption device that encrypts the music playing data file decrypted by the first decrypting device with a second encryption key;
a second storing device that stores the encrypted music playing data file encrypted by the second encryption device;
a first deleting device that deletes the encrypted music playing data file stored in the first storing device upon storing the encrypted music playing data file in the second storing device;
a second decrypting device that decrypts the encrypted music playing data file from the second storing device with a second decrypting key that corresponds to the second encryption key to permit the decrypted music playing data file to be played by the automatic music playing apparatus;
a third storing device that temporarily stores the decrypted music playing data file decrypted by the second decrypting device, wherein the automatic music playing device plays music by controlling a tone generator that generates musical tone signals for a musical performance based on the decrypted music playing data file stored in the third storing device; and a second deleting device that deletes the decrypted music playing data file stored in the third storing device after the automatic music playing device plays the decrypted music playing data file, stored in the third storing device.

6. The electronic musical system according to claim 5, wherein the received music work resource is encrypted, and the music playing data extracting device decrypts the received encrypted music work resource, extracts the music playing data file from the decrypted music work information source, and deletes the decrypted music work resource after extracting the music playing data file.

7. A computer-readable medium storing a computer program for ensuring secure use of a music playing data file, the program comprising instructions for:
receiving a music work resource;
extracting a music playing data file from the received music work information resource;
encrypting the extracted music playing data file with an encryption key;
storing the encrypted music playing data file in a first storing device;
decrypting the encrypted music playing data file from the first storing device with a decryption key that corresponds to the encryption key to permit the decrypted music playing data file to be played;
storing temporarily the decrypted music playing data file in a second storing device;
playing music automatically by controlling a tone generator for generating musical tone signals for a musical performance based on the temporarily stored decrypted music playing data file from the second storing device; and
deleting the decrypted music playing data file stored in the second storing device after automatically playing the decrypted music playing data file stored in the second storing device,
wherein the received music resource is in a data format that is unplayable by the automatic music playing device, regardless whether the received music resource is in a decrypted or encrypted form.

8. The computer-readable medium according to claim 7, wherein the received music work resource is encrypted, and the extracting instruction includes the instructions for decrypting the received encrypted music work resource, extracting the music playing data file from the decrypted music work information source, and deleting the decrypted music work resource after extracting the music playing data file.

\* \* \* \* \*